Patented June 3, 1930

1,761,506

UNITED STATES PATENT OFFICE

HARRY M. WILLIAMS, OF DAYTON, OHIO, ASSIGNOR TO GENERAL MOTORS RESEARCH CORPORATION, A CORPORATION OF DELAWARE

METHOD OF MAKING ARTICLES OF LEAD-COPPER AND ANALOGOUS ALLOYS

No Drawing. Application filed July 22, 1925. Serial No. 45,287.

This invention relates to the manufacture of articles consisting of mixtures of metals which are miscible in a molten state but which, on freezing, separate more or less completely.

The usual method of making alloys, or other mixtures of different metals, is to melt the two metallic ingredients, mix them together and allow them to harden or freeze. When this method is attempted with certain metals, such as copper and lead, nickel and lead, and many others, the lead, for example, separates from the copper, when the latter freezes, so that if, for example, copper and lead were mixed together in a molten condition and allowed to harden, the lead, being heavier would form a layer at the bottom.

It is desirable to manufacture alloys or mixtures of this sort for many purposes, for example, bearing bushings made of a homogeneous mixture of copper and lead, are desirable for the reason that they can be readily machined in place. Dynamo electric brushes containing the same material are also desirable.

By the process hereinafter described, bodies made of copper and lead, or similar mixtures, may be readily produced. In carrying out the process, fine solid particles of a copper-lead mixture, for example, may be compressed under heavy pressure, into the form of the desired article. The blank thus formed may then be heat-treated in a non-oxidizing environment until the particles fuse together into a solid mass by the union of portions of the lead constituents in the contiguous particles. This mass may then be machined to any extent desired. The non-oxidizing environment may be carbon contained in muffles, hydrogen gas, carbon dioxide, or other gases suitable for the purpose.

The powders of copper-lead mixtures may also be mixed with a volatile solid, such as salicylic acid, compressed into shape, and then heated until the salicylic acid volatilizes and the metallic particles fuse together. In place of salicylic acid, other volatile materials such as naphthalene, benzoic acid, or ammonium nitrate, may be used. The volatilization of the volatile solid produces fine interstices throughout the metallic mass.

In making bearings and brushes, it is sometimes desirable to produce porous bodies with their interstices filled with particles of non-metallic filling, such as graphite, magnesia, or other refractory substance, which act as an internal bracing for the walls of the interstices. In such case, the metallic powders are mixed with a suitable proportion of finely-divided filling material, with or without a small quantity of volatile matter.

A specific example of a compressed blank made from combined particles and salicylic acid may contain, say, 94 parts of copper-lead powders and 6 parts of salicylic acid.

In case a filler is used, about 6 parts of graphite or other filler may be mixed with 94 parts of metallic powders and a small additional quantity, say 2 to 4 parts, of salicylic acid.

The copper-lead powder should, preferably be sufficiently fine to pass through a 200-mesh sieve. The mixture should be compressed under very high pressure, which may reach 75,000 or 80,000 lbs. per square inch.

Blanks so formed and compressed may be heated in a non-oxidizing atmosphere to a temperature sufficient to cause the particles to fuse together, but not high enough to melt down the structure. Bearings and brushes made as described, are porous and will hold a considerable quantity of lubricant.

In fitting porous bearings to small machines, such as small electric motors or generators, it is sometimes desirable to ream the bearings to make them concentric. Bearings made of copper and lead may be readily reamed after they are in place and so alined with one another.

In case it is desired to have a non-porous alloy or metallic mixture, the article may be heavily compressed in a die, after it has been removed from the sintering furnace, either while still hot, or after it has become cold.

A method of producing the alloy in powdered form has been made the subject of a copending application Serial No. 45,285 filed by me of even date herewith, now issued Patent No. 1,635,653. In case powders of a copper-lead metal are required, the lead and copper should be mixed together while in a molten condition, placed in a highly-heated crucible having an attached nozzle, and then while maintaining the crucible and the nozzle in a highly-heated condition, atomizing the stream of metal passing through the nozzle by a stream of aeriform fluid under pressure. As the mixture is atomized while it is at a temperature at which the lead and copper mix, the mixture solidifies when subdivided into fine particles so quickly that there is no opportunity for the separation of the lead from the copper to take place, as occurs when relatively large masses of the molten metals are mixed together and allowed to solidify.

While the form of embodiment of the invention as herein described, constitutes a preferred form, it is to be understood that other forms might be adopted, all coming within the scope of the claims which follow.

What is claimed is as follows:

1. A method of making bearings or other articles containing a homogeneous mixture of copper and lead, which consists in compressing solid particles each composed of a copper-lead mixture into the form desired, then heating the blank thus formed in a non-oxidizing environment until the particles cohere.

2. A method of making bearings or other articles containing a homogeneous mixture of metals which do not alloy or only partially alloy in the solid state, which consists in mixing the metals while in a molten condition, atomizing the molten mixture to form metal powder whose grains are individually composed of non-alloying metals, compressing the solid particles produced by atomizing into the form desired, and heating the blank so formed in a non-oxidizing atmosphere until the particles cohere by a fusing together of the lower melting constituent metal.

3. A method of making bearings or other articles of a copper-lead mixture, which consists in mixing copper and lead while in a molten condition, atomizing the molten mixture, compressing the solid particles so produced into the form desired, and heating the blank so formed in a non-oxidizing atmosphere until the particles cohere.

4. A method of making porous metal bodies containing a mixture of copper and lead, which consists in mixing solid particles each composed of a mixture of copper and lead with a finely divided volatile void forming substance, compressing the mixture into the desired form, and heating the form until the particles cohere and the void forming substance volatilizes.

5. A method of making porous metal bodies containing a mixture of metals which do not alloy or only partially alloy in the solid state, which consists in mixing solid particles individually composed of a mixture of the non-alloying metals with a finely divided filler substance and with a finely divided volatile void forming substance, compressing the mixture into the desired form, by a fusing together of portions of the lower melting constituent metal and heating the form until the particles cohere and the void forming substance volatilizes.

6. A method of making porous metal bodies containing a mixture of metals which do not alloy or only partially alloy in the solid state, which consists in mixing solid particles individually composed of a mixture of the non-alloying metals with finely divided graphite and salicylic acid; compressing the mixture into the desired form, and heating the form until the particles unite by a welding together of contiguous particles of the lower melting metal constituent and the salicylic acid volatilizes.

7. A method of making porous metal bodies containing a mixture of copper and lead, which consists in mixing solid particles each composed of a mixture of copper and lead with finely divided graphite and salicylic acid; compressing the mixture into the desired form, and heating the form until the particles cohere and the salicylic acid volatilizes.

In testimony whereof I hereto affix my signature.

HARRY M. WILLIAMS.